United States Patent [19]

Armstrong

[11] Patent Number: 5,154,738
[45] Date of Patent: Oct. 13, 1992

[54] CHIRAL SEPARATION MEDIA

[75] Inventor: Daniel Armstrong, Rolla, Mo.

[73] Assignee: Advanced Separation Technologies, Inc., Whippany, N.J.

[21] Appl. No.: 747,386

[22] Filed: Aug. 20, 1991

Related U.S. Application Data

[60] Division of Ser. No. 564,628, Aug. 8, 1990, Pat. No. 5,064,944, which is a continuation-in-part of Ser. No. 406,141, Sep. 12, 1989, Pat. No. 4,948,395.

[51] Int. Cl.[5] .............................. B01D 15/08
[52] U.S. Cl. .......................... 55/67; 55/386; 536/46
[58] Field of Search ............. 55/67, 191, 386; 536/1.1, 46, 103

[56] References Cited

U.S. PATENT DOCUMENTS

| | | | |
|---|---|---|---|
| 3,453,257 | 7/1969 | Parmerter et al. | 536/46 |
| 3,453,258 | 7/1969 | Parmerter et al. | 536/46 |
| 3,453,259 | 7/1969 | Parmerter et al. | 536/46 |
| 3,459,731 | 8/1969 | Gramera et al. | 536/103 |
| 3,459,732 | 8/1969 | Hull et al. | 536/46 |
| 4,426,292 | 1/1984 | Wernick et al. | 55/67 X |
| 4,482,709 | 11/1984 | Iwao et al. | 536/46 |
| 4,539,399 | 6/1985 | Armstrong | 210/502.1 X |
| 4,638,058 | 1/1987 | Brandt et al. | 536/103 |
| 4,727,064 | 2/1988 | Pitha | 536/103 |
| 4,764,604 | 8/1988 | Müller | 536/103 |
| 4,867,884 | 9/1989 | Rendleman, Jr. | 536/46 X |
| 4,948,395 | 8/1990 | Armstrong | 55/67 |
| 5,064,944 | 11/1991 | Armstrong | 536/1.1 |

FOREIGN PATENT DOCUMENTS

| | | | |
|---|---|---|---|
| 2403098 | 5/1979 | France | 55/386 |
| 57-097446 | 6/1982 | Japan | 55/386 |
| 60-248729 | 12/1985 | Japan | 536/46 |

OTHER PUBLICATIONS

W. Konig et al., "Cyclodextrins as Chiral Stationary Phases in Capillary Gas Chromatography", *Journal of Chromatography*, 447 (1988), 193-197.

W. Konig, "Enanatioselective Gas Chromatography with Modified Cyclodextrins as Chiral Stationary Phases".

Macherey-Nagel, "The Separation of Chiral Molecules and Control of Optical Purity by TLC, GLC, HPLC".

*Primary Examiner*—Robert Spitzer
*Attorney, Agent, or Firm*—Lucas & Just

[57] ABSTRACT

The media is an ether derivative of cyclodextrin such as a permethylated hydroxy ether of cyclodextrin or a dialkyl trifluoroacetyl ether derivative of cyclodextrin and is used in capillary gas chromatographic columns. Particular benefit is obtained using the ether derivative of cyclodextrin in a fused silica capillary.

7 Claims, No Drawings

CHIRAL SEPARATION MEDIA

This is a division of application Ser. No. 07/564,628 filed Aug. 8, 1990, now U.S. Pat. No. 5,064,944, which, in turn, is a continuation-in-part of application Ser. No. 406,141 filed Sept. 12, 1989 and now U.S. Pat. No. 4,948,395 issued Aug. 14, 1990.

This invention relates to a composition used for separation of optical isomers or chiral compounds, as well as other isomeric and non-isomeric compounds, by means of gas chromatography and, more particularly, to the separation of enantiomers by capillary gas chromatography. The composition used is a media of an ether derivative of a cyclodextrin such as a permethylated hydroxy or a dialkyl trifluoroacetyl ether of cyclodextrin.

The configuration of a chiral molecule is generally what determines its biological and pharmaceutical activity and effectiveness. One of the enantiomers of the chiral molecule may be active and the other may be inactive or even toxic. It is therefore essential to be able to separate the different enantiomers from each other to obtain an isolated enantiomer in pure form. The isolated enantiomers are used in the pharmaceutical, pesticide and/or herbicide industries, among others.

A conventional way to separate enantiomers is by gas chromatography using a chiral stationary phase. Chiral stationary phases can rapidly and reversibly form diastereomeric association complexes with chiral analytes. Successful chiral stationary phases for wall-coated capillary tubes should have some characteristic properties. They need to be highly viscous even at elevated temperatures and have the proper surface tension to wet the capillary wall completely. They should be able to form rapid and reversible diastereomeric associate complexes with the chiral analytes via various interactions such as hydrogen bonding, dispersion, dipole-dipole and steric interactions to give reasonable chiral selectivity. Other desirable properties include high temperature stability, no racemization at elevated temperatures and low levels of bleeding.

Most of the early work on chiral stationary phases for gas chromatography used amino acids, peptides, and various derivatives thereof. Some efforts have been made to use other naturally occurring chiral molecules as chiral stationary phases such as tartaric acid, malic acid, mandelic acid and chrysanthemic acid. Despite a large amount of work in this area, the only resulting widely available and commercially viable chiral stationary phase for gas chromatography has been Chirasil-Val from Macherey-Nagel of the Federal Republic of Germany which consists of a siloxane copolymer to which L-valine-tert-butylamide was coupled.

There are a number of limitations to these early amino acid based gas chromatography chiral stationary phases. First, they do not seem to be widely applicable. Most of the reported separations were of racemic amino acid derivatives. Just as significant was the fact that, using these early chiral separation phases, the high column temperature needed for gas chromatography often results in racemization, decomposition and bleeding of the chiral stationary phase. Even the moderately successful Chirasil-Val is not recommended to be used at temperatures much above 200° C. Also, the enantioselectivity of the chiral stationary phase decreases significantly at the higher temperatures needed for gas chromatography.

Previously there have been a number of efforts to use alpha- and beta-cyclodextrin as gas chromatography stationary phases. It was apparent from the early gas chromatography and more recent liquid chromatography work that cyclodextrins had potential as gas chromatographic stationary phases. Unfortunately, the cyclodextrin gas chromatography stationary phases were not as successful as the liquid chromatography bonded stationary phases. Although interesting selectivities, mainly for achiral solutes, were obtained, the efficiency and reproducibility were less than desirable. Cyclodextrins are crystalline solids and had to be dissolved or suspended in another solvent prior to coating the separation column. The fact that native cyclodextrins and their simple derivatives (dimethyl, acetyl, etc.) are crystalline solids with high melting or decomposition points, makes them difficult to use directly as gas chromatography stationary phase coatings. Recently, there have been reports on derivatized cyclodextrins that are liquids or lower melting point amorphous solids and therefore can be used directly as stationary phase coatings. All of these previous compounds are lipophilic derivatives of cyclodextrin (such as perpentyl-beta-cyclodextrin).

Cyclodextrins (also called "Schardinger dextrins") are known to be cyclic oligosaccharides composed of glucose residues bonded together by alpha 1,4 bonds. The six, seven and eight membered rings are called alpha-, beta-, and gamma-cyclodextrin, respectively. The cyclodextrins have different chemical and physical properties from the linear oligosaccharides derived from starch in that they are non-reducing dextrins and the ring structure is widely used as a host for the inclusion of various compounds, usually organic compounds for the food, pharmaceutical, and chemical fields.

As is also well-known, cyclodextrins are produced from starch of any selected plant variety such as corn, potato, waxy maize and the like which may be modified, or unmodified starch derived from cereal or tuber origin and the amylose or amylopectin fractions thereof. The selected starch in aqueous slurry at selected concentrations up to about 35% by weight solids is usually liquefied as by gelatinization or treatment with a liquefying enzyme such as bacterial alpha-amylase enzyme and then subjected to treatment with a transglycosylase (CGT) enzyme to form the cyclodextrins.

The amount of the individual alpha-, beta- and gamma-cyclodextrins produced by treating the starch with the CGT enzyme will vary depending on the selected starch, selected CGT enzyme and processing conditions. The parameters to select for the CGT enzyme conversion for the desired result in the amount of each individual cyclodextrin to be produced is conventional and well-described in the literature.

Conventionally, the DE of the liquefied starch is maintained below about 20 DE, the starch solids concentration is below about 35% by weight, the pH for conversion may be about 4.5 to 8.5 at a selected temperature from ambient up to about 75° C. for a selected period of time, typically from about 10 hours up to seven days and more. The amount of CGT enzyme used for conversion is conventional and well-known in the art.

It has now been discovered that ether derivatives of cyclodextrin such as permethylated hydroxy ethers of cyclodextrin and dialkyl trifluoroacetyl ethers of cyclodextrin can be used to separate a wide variety of optical isomers. The optical isomers resolved include chiral alcohols, diols, polyols, amines, amino alcohols, halohydrocarbons, ketones, lactones, alpha-halocarboxylic acid esters, carbohydrates, epoxides, glycidyl analogues, haloephihydrins, nicotine compounds, pyrans, furans, bicyclic and heterocyclic compounds and other miscellaneous compounds.

The permethylated hydroxy ether of cyclodextrin is hydrophilic and relatively polar compared to previous cyclodextrin derivatives used as chiral stationary phases. The dialkyl trifluoroacetyl derivative is of intermediate polarity. Both of these ether derivatives of cyclodextrin have better coating properties on fused silica capillaries than the hydrophobic cyclodextrin derivatives. The more hydrophilic permethylated hydroxy ether of cyclodextrin and the dialkyl trifluoroacetyl derivatives have different selectivities for the enantiomers as compared to the hydrophobic cyclodextrin derivatives. Also, they can be used at higher temperatures than Chirasil-Val without racemization.

With respect to the ether derivative of cyclodextrin which is a permethylated hydroxy cyclodextrin, the degree of substitution (DS) of the hydroxy ether groups for the hydroxyl groups on the underivatized cyclodextrin molecule is from about 10% to about 75% of the available hydroxyl groups on the cyclodextrin. For example, for alpha-cyclodextrin the DS for the hydroxy ether groups is about 2 to about 12; for beta-cyclodextrin, about 2 to about 14; and for gamma-cyclodextrin, about 2 to about 16. More preferably, the DS is about 25% to about 60% of the available sites and more preferred is about 40%. It is important that the degree of substitution of the cyclodextrin hydroxy groups by the ether side chains be random and non-uniform.

The DS of the methyl groups for the remaining hydroxyl groups on the cyclodextrin and the hydroxyl groups on the ether side chains of the cyclodextrin is greater than about 90% and more preferably above about 95%. Ideally, all of the available hydroxyl sites on the hydroxy ether of cyclodextrin are methylated; although this is sometimes difficult to achieve.

The permethylated hydroxy ether of cyclodextrin is made in a conventional manner starting from either individual cyclodextrin or mixtures of the alpha-, beta- and/or gamma-cyclodextrins. However, it is preferred to use only a single cyclodextrin, i.e. either alpha-, beta-, or gamma-cyclodextrin. The separation and/or purification of the alpha-, beta-, and gamma-cyclodextrin may be done before, after, or at any stage of the derivatization process. The procedure for making the hydroxy ether of cyclodextrin and the subsequent step of methylating are accomplished in a conventional manner. The order of reaction for forming the permethylated hydroxy ether cyclodextrin derivative is first to make the hydroxy ether and then to methylate it.

In order to etherify the underivatized cyclodextrin, the cyclodextrin is suitably reacted with an epoxide. Suitable epoxides include ethylene oxide, propylene oxide, butylene oxide, amylene oxide, glycidol (hydroxypropylene oxide), butadiene oxide, glycidyl methyl ether, glycidyl isopropyl ether, alkyl glycidyl ether, styrene oxide, and t-butyl glycidyl ether. Preferably, the epoxide is selected from the group consisting of propylene oxide, glycidyl methyl ether, glycidyl isopropyl ether, alkyl glycidyl ether, t-butyl glycidyl ether and styrene oxide. Good results have been obtained with an epoxide selected from the group consisting of propylene oxide, glycidyl methyl ether and glycidyl isopropyl ether.

As is known, the reaction of cyclodextrin with the above noted epoxides produces an ether of cyclodextrin with two hydroxy groups on adjacent carbon atoms on the side chains. Such hydroxy ethers of cyclodextrin are sometimes referred to as dihydroxyalkyl ethers of cyclodextrin.

The preferred permethylated ether derivatives of cyclodextrin for use in the present invention include hydroxy propylated cyclodextrin, hydroxy propylated methyl ether cyclodextrin, hydroxy propylated isopropyl ether cyclodextrin, hydroxy propylated vinyl ether cyclodextrin, hydroxy propylated t-butyl ether cyclodextrin, and hydroxy ethylated phenyl cyclodextrin. Good results have been obtained with hydroxy propylated cyclodextrin, hydroxy propylated methyl ether cyclodextrin and hydroxy propylated isopropyl ether cyclodextrin.

With respect to the ether derivative of cyclodextrin which is a dialkyl trifluoroacetyl cyclodextrin, the degree of substitution (DS) of the alkyl groups for the hydrogens of the hydroxyl groups on the underivatized cyclodextrin molecule to form the etherified derivative is from about 20% to about 80% of the available hydrogens on the cyclodextrin. For example, for alpha-cyclodextrin the DS for the alkyl groups is about 1 to about 15; for beta-cyclodextrin, about 1 to about 16; and for gamma-cyclodextrin, about 1 to about 18. More preferably, the DS is about 40% to about 70% of the available sites and more preferred is about 65%. Generally, the alkyl groups will substitute for the hydrogens on the 2 and 6 carbons. It is important that the degree of substitution of the cyclodextrin hydroxy groups by the ether side chains be random and non-uniform.

The DS of the trifluoroacetyl group for the hydrogen of the remaining available hydroxyl group on the cyclodextrin is greater than about 90% and more preferably above about 95%.

The dialkyl trifluoroacetyl ether of cyclodextrin is made in a conventional manner starting from either individual cyclodextrin or mixtures of the alpha-, beta- and/or gamma-cyclodextrins. However, it is preferred to use only a single cyclodextrin, i.e. either alpha-, beta-, or gamma-cyclodextrin. The separation and/or purification of the alpha-, beta-, and gamma-cyclodextrin may be done before, after, or at any stage of the derivatization process. The procedure for making the ether of cyclodextrin and the subsequent step of esterifying are accomplished in a conventional manner. The order of reaction for forming the cyclodextrin derivative is first to make the ether derivative and then to esterify it.

In order to form the dialkylated ether derivative of cyclodextrin, the cyclodextrin is first suitably reacted with an alkyl halide to form an ether derivative. Suitable alkyl halides include chlorinated, brominated, iodiated or fluorinated alkanes such as methane, ethane, propane, butane, pentane or hexane. The alkanes may be straight-chained or branched. Preferably, the alkyl halide is selected from the group consisting of n-propyl bromide, n-propyl chloride, n-butyl chloride, n-butyl bromide, n-pentyl bromide and n-pentyl chloride. Best results have been obtained with n-pentyl bromide.

Suitably, in order to esterify the ether derivative of cyclodextrin, fluorinated anhydrides are used. It is more preferred to use fluorinated anhydrides such as trifluoroacetic anhydride, trifluorobutanoic anhydride, or trifluoropropanoic anhydride. It is most preferred to use trifluoroacetic anhydride.

The preferred dialkyl trifluoroacetic ether derivatives of cyclodextrin for use in the present invention include dipentyl trifluoroacetic ether cyclodextrin, dipentyl trifluoroacetic ether cyclodextrin, dipentyl trifluorobutanoic ether cyclodextrin and dipentyl trifluoropropanoic ether cyclodextrin.

The gas chromatography is performed in a conventional manner.

It is preferred to use fused silica capillaries when performing the gas chromatography operation. Fused silica capillaries are much more flexible, practical and easier to handle than conventional glass capillaries.

The ether derivatives of cyclodextrin of the present invention are liquids at room temperature and can be used to coat undeactivated fused silica capillaries. They are nonvolatile and are thermally stable at temperatures up to about 300° C. in the absence of oxygen.

The gas chromatography can also be performed by administering the ether derivative of cyclodextrin of the present invention to a packed column by means of a carrier such as polysiloxane or polyethylene glycol. The admixture of the ether derivative of cyclodextrin of the present invention with the carrier and the administration of this admixture to the column is performed in a conventional manner.

The solid support in the packed column may be any suitable support such as diatomaceous earth, Teflon powder, or fine glass beads. The selection of the type, size and shape of the solid support depends on the molecules being isolated and the flow rate desired. The determination of which solid support to use is conventional and well-known to those of skill in the art.

Although it is less common, enantioselective reversals also can occur among like-derivatized alpha-, beta-, and gamma-cyclodextrins. Reversals in elution order have been observed between alpha- and beta-cyclodextrin and between beta- and gamma-cyclodextrin.

Further details and advantages of the present invention may be more fully understood by reference to the following examples.

EXAMPLE 1

This example illustrates making a permethylated hydroxypropylated ether derivative of cyclodextrin of the present invention.

The permethyl hydroxypropyl ether derivative of cyclodextrin was made in two steps. First, propylene oxide, sodium hydride and the desired cyclodextrin (either alpha-, beta-, or gamma-) were dissolved in dimethyl sulfoxide (DMSO) at 60° C. and allowed to react for one hour with stirring. After cooling to room temperature for 15 hours, the mixture was further cooled in an ice bath. Excess methyl iodide was added dropwise. After 24 hours the reaction was complete.

EXAMPLE 2

This example illustrates the making of the dialkyl trifluoroacetyl ether derivative of cyclodextrin of the present invention. The alkane used herein is pentane.

3.0 g of dried cyclodextrin and excess 1-bromopentane were added to 30 ml dimethyl sulfoxide (DMSO). The reaction was carried out at 60° C. for 6 hours. Water was then added to the reaction mixture and a waxy precipitate was obtained. The raw product was dissolved in chloroform ($CHCl_3$) and the solution was washed with water. $CHCl_3$ was removed under vacuum and the product was used for the next reaction without further purification.

The above material and an excess of trifluoroacetic anhydride were added to 30 ml tetrahydrofuran (THF). The mixture was boiled for 2 hours, then poured over ice to precipitate the product. The precipitate was washed with cold water and dissolved in $CHCl_3$. The $CHCl_3$ solution was extracted three times with 5% aqueous sodium bicarbonate ($NaHCO_3$) and three times with water. The $CHCl_3$ layer was collected and dried with anhydrous sodium sulfate ($Na_2SO_4$). $CHCl_3$ was allowed to evaporate in a vacuum desiccator and the final viscous liquid was dried in a vacuum overnight to form the final product of dipentyl trifluoroacetyl ether cyclodextrin derivative.

EXAMPLE 3

This example illustrates separating optical isomers using the medium made in Example 1 above. The optical isomers were derivatized in order to decrease their volatility for better resolution in the gas chromatograph process.

Fused silica capillary tubes (0.25 mm ID) were obtained from Alltech or Supelco. The capillaries were coated with the cyclodextrin derivatives of the present invention via the static method.

Untreated 10 m capillary columns were placed in a water bath at 36° C. A 0.2% w/v ether solution of the cyclodextrin derivative of the present invention filled the capillary. One end of the capillary was sealed and the other connected to a vacuum line. It took about 4 hours to coat a 10 m column. The column efficiency was tested at 100° C. by using n-hydrocarbons (C11 and C12) as test solutes. Only columns that produced $\geq 3600$ plates per column meter were used.

Racemic mixtures of amines and alcohols to be resolved were derivatized with trifluoroacetic anhydride, acetic anhydride or chloroacetic anhydride. Other compounds containing hydroxyl and/or amine functionalities were also derivitized. All chemicals were obtained from Aldrich Chemical Co., Sigma Chemical Co., or Fluka Chemical Co. In each case, approximately 1.0 mg of the racemic analyte was dissolved in 0.5 ml of methylene chloride and 200 $\mu l$ of the desired anhydride added. After reacting for about 5–30 minutes, dry nitrogen was bubbled through the solution to remove excess reagent. The solution residue was dissolved in 0.5 ml of ether or methanol for chromatographic analysis. Racemic mixtures of sugars to be resolved were trifluoroacetylated by the above procedure except that tetrahydrofuran was used as the solvent. Also, because this reaction was somewhat slower and the trifluoroacetic anhydride was volatile, three additional aliquots of trifluoroacetic anhydride were added at seven minute intervals.

Both Hewlett Packard (5710A) and Varian (3700) gas chromatographs were used for all separations. Split injection and flame ionization detection were utilized. The injection and detector port temperatures were 200° C. and nitrogen was used as the carrier gas. Gas velocity was about 10–15 cm/sec. A split ratio of 100/1 was used for all the columns and at all of the column temperatures. The injection volume was 0.5 $\mu l$.

Referring to the following tables, the separation factor, $\alpha$, is a measure of the separation between the eluted peaks. The greater the separation between the peaks, the greater is $\alpha$. Mathematically, $\alpha$ is defined as the ratio of the corrected retention times of the two peaks being compared i.e., $$\alpha = \frac{t'_2}{t'_1} = \frac{t_2 - t_0}{t_1 - t_0}$$

where $t'$=corrected retention time, $t$=uncorrected time and $t_0$=retention time of an unretained compound. Traditionally, the longest retained peak time, $t_2$, is put in the numerator so that $\alpha$ will be greater than 1. An $\alpha$-value of 1 means that there is no separation (the peaks co-elute).

Tables IA, IB and IC illustrate the separation results using permethylated hydroxypropyl ether cyclodextrin (PHCD) as the ether derivative of cyclodextrin. Tables IA, IB and IC show the results using alpha-, beta-, and gamma-cyclodextrin, respectively. The permethylated hydroxypropyl ether cyclodextrin was made in accordance with Example 1 above.

TABLE Ia

Alpha-Cyclodextrin
(DS by hydroxypropyl = average about 7, ranged between 2–12)

| Structure | Compound | Column Length (m) | Temperature (°C.) | R | $\alpha$ | Elution Order (if known) |
|---|---|---|---|---|---|---|
| Sugars* | | | | | | |
| CH₂OR, O, OH, HO, OH, OH (allose structure) | allose | 9 | 100 | $-\overset{O}{\underset{\|}{C}}-CF_3$ | 1.10 | — |
| ROCH₂, O, OH, OH, OH (ribose structure) | ribose | 9 | 100 | $-\overset{O}{\underset{\|}{C}}-CF_3$ | 1.02 | — |
| Alcohols | | | | | | |
| (isopinocampheol structure with OR) | isopinocamphenol | 9 | 90 | $-\overset{O}{\underset{\|}{C}}-CF_3$ | 1.01 | — |
| (S-S dithiane structure with OR, OR) | trans-1,2-dithiane-4,5-diol | 9 | 100 | $-\overset{O}{\underset{\|}{C}}-CF_3$ | 1.12 | — |
| (tetrahydronaphthol structure with OR) | 1,2,3,4-tetrahydro-1-naphthol | 9 | 100 | $-\overset{O}{\underset{\|}{C}}-CF_3$ | 1.03 | S, R |
| Amines | | | | | | |
| (3-aminoheptane structure with NHR) | 3-aminoheptane | 9 | 90 | $-\overset{O}{\underset{\|}{C}}-CF_3$ | 1.04 | — |
| (2-aminoheptane structure with NHR) | 2-aminoheptane | 9 | 90 | $-\overset{O}{\underset{\|}{C}}-CF_3$ | 1.05 | — |
| (1,5-dimethylhexylamine structure with NHR) | 1,5-dimethylhexyl-amine | 9 | 90 | $-\overset{O}{\underset{\|}{C}}-CF_3$ | 1.04 | — |
| (1-phenyl ethyl amine structure with NHR) | 1-phenyl ethyl amine | 9 | 90 | $-\overset{O}{\underset{\|}{C}}-CF_3$ | 1.02 | — |

TABLE Ia-continued

Alpha-Cyclodextrin
(DS by hydroxypropyl = average about 7, ranged between 2-12)

| Structure | Compound | Column Length (m) | Temperature (°C.) | R | α | Elution Order (if known) |
|---|---|---|---|---|---|---|
| NHR (tetrahydronaphthyl) | 1,2,3,4-tetrahydro-1-naphthylamine | 9 | 130 | —C(O)—CF$_3$ | 1.03 | — |
| NHR (1-naphthylethyl) | 1-(1-naphthyl)-ethylamine | 9 | 150 | —C(O)—CF$_3$ | 1.03 | S, R |
| Amino Alcohols | | | | | | |
| NHR, OCH$_3$ | 2-amino-1-methoxy-propane | 9 | 100 | —C(O)—CH$_3$ | 1.03 | — |
| NHR, OR | 2-amino-1-propanol | 9 | 120 | —C(O)—CH$_3$ | 1.02 | — |
| RHN, OR | 1-amino-2-propanol | 9 | 120 | —C(O)—CH$_3$ | 1.01 | — |
| NHR, OR | 2-amino-1-butanol | 9 | 120 | —C(O)—CH$_3$ | 1.02 | — |
| Bicyclic Compounds | | | | | | |
| NHR (exo-norbornyl) | exo-2-amino-norbornane | 9 | 100 | —C(O)—CF$_3$ | 1.01 | — |
| NHR (endo-norbornyl) | endo-2-amino-norbornane | 9 | 90 | —C(O)—CF$_3$ | 1.02 | — |

*only D-form is shown

TABLE Ib

Beta-Cyclodextrin
(DS by hydroxypropyl = average 8, range 2-14)

| Structure | Compound | Column Length (m) | Temperature (°C.) | R | α | Elution Order (if known) |
|---|---|---|---|---|---|---|
| Alcohols | | | | | | |
| S-S, OR, OR (dithiane diol) | trans-1,2-dithiane-4,5-diol | 10 | 100 | —C(O)—CF$_3$ | 1.06 | — |
| OR (isopinocamphenyl) | isopinocamphenol | 10 | 90 | —C(O)—CF$_3$ | 1.10 | — |

TABLE Ib-continued

Beta-Cyclodextrin
(DS by hydroxypropyl = average 8, range 2-14)

| Structure | Compound | Column Length (m) | Temperature (°C.) | R | α | Elution Order (if known) |
|---|---|---|---|---|---|---|
| (1,2,3,4-tetrahydronaphthalene with OR) | 1,2,3,4-tetrahydro-1-naphthol | 20 | 120 | —C(O)—CF$_3$ | 1.07 | R, S |
| (indane with OR) | 1-indanol | 20 | 110 | —C(O)—CF$_3$ | 1.05 | — |
| (cyclohexane with OH, OH) | trans-cyclohexane 1,2 diol | 30 | | —CCH$_2$Cl (O) | 1.05 | — |
| Amino Alcohols | | | | | | |
| (structure with NHR, OMe) | 2-amino-1-methoxy propane | 20 | 110 | —C(O)—CH$_3$ | 1.06 | — |
| (R-O-CH$_2$-CH(NHR)-CH$_3$) | 2-amino-1-propanol | 20 | 120 | —C(O)—CH$_3$ | 1.04 | — |
| (RHN-CH$_2$-CH(OR)-CH$_3$) | 1-amino-2-propanol | 20 | 120 | —C(O)—CH$_3$ | 1.06 | — |
| (R-O-CH$_2$-CH(NHR)-CH$_3$) | 2-amino-1-propanol | 30 | 120 | —CCH$_2$Cl (O) | 1.04 | — |
| (structure with NHR, OMe) | 2-amino-1-methoxy propane | 30 | 120 | —CCH$_2$Cl (O) | 1.07 | — |
| (RO-CH$_2$-CH(NHR)-CH$_2$CH$_3$) | 2-amino-1-butanol | 20 | 120 | —C(O)—CH$_3$ | 1.05 | — |
| (RO-CH$_2$-CH(NHR)-CH(CH$_3$)$_2$) | 2-amino-3-methyl-butanol | 10 | 120 | —C(O)—CH$_3$ | 1.03 | — |
| Amines | | | | | | |
| (CH$_3$-CH(NHR)-CH$_2$-CH$_2$-CH$_3$) | 2-aminopentane | 9 | 70 | —C(O)—CF$_3$ | 1.05 | — |
| (CH$_3$-CH(NHR)-CH$_2$-CH(CH$_3$)$_2$) | 1,3-dimethylbutylamine | 9 | 70 | —C(O)—CF$_3$ | 1.04 | — |
| (3-aminoheptane structure) | 3-aminoheptane | 9 | 80 | —C(O)—CF$_3$ | 1.08 | — |
| (2-aminoheptane structure) | 2-aminoheptane | 9 | 80 | —C(O)—CF$_3$ | 1.12 | — |
| (1,5-dimethylhexyl amine structure) | 1,5-dimethylhexyl amine | 9 | 80 | —C(O)—CF$_3$ | 1.15 | — |

TABLE Ib-continued

Beta-Cyclodextrin
(DS by hydroxypropyl = average 8, range 2-14)

| Structure | Compound | Column Length (m) | Temperature (°C.) | R | α | Elution Order (if known) |
|---|---|---|---|---|---|---|
| [NHR-cyclohexyl structure] | 1-cyclohexyl-ethylamine | 9 | 100 | $-\overset{O}{\underset{\|}{C}}-CF_3$ | 1.05 | — |
| [NHR-phenyl structure] | 1-phenyl-ethyl-amine | 9 | 100 | $-\overset{O}{\underset{\|}{C}}-CF_3$ | 1.04 | — |
| [NHR-indan structure] | 1-aminoindan | 20 | 150 | $-\overset{O}{\underset{\|}{C}}-CF_3$ | 1.01 | — |
| [NH₂-cyclohexyl structure] | 1-cyclohexylethyl-amine | 30 |  | $-\overset{O}{\underset{\|}{C}}-CH_3$ | 1.05 | — |
| [NHR-naphthyl structure] | 1-alpha-naphthyl)-ethylamine | 30 |  | $-\overset{O}{\underset{\|}{C}}CH_3$ | 1.02 | — |
| [NHR-tetrahydronaphthyl structure] | 1,2,3,4-tetrahydro-1-naphthylamine | 20 | 150 | $-\overset{O}{\underset{\|}{C}}-CF_3$ | 1.04 | — |

Nicotine Compounds

| | | | | | | |
|---|---|---|---|---|---|---|
| [pyridine-pyrrolidinyl structure] | 3-(1-trifluoromethyl carbonyl-2-pyrrolidinyl) pyridine | 20 | 140-180 | $-\overset{O}{\underset{\|}{C}}-CF_3$ | 1.01 1.00 | — |

Lactones

| | | | | | | |
|---|---|---|---|---|---|---|
| [butyrolactone structure with RO] | β, β-dimethyl-γ-(hydroxymethyl)-γ-butyrolactone | 9 | 100 | $-\overset{O}{\underset{\|}{C}}-CF_3$ | 1.02 | — |
| [NH₂-butyrolactone structure] | α-amino-γ-butyryl lactone | 30 | 100 | $-\overset{O}{\underset{\|}{C}}CH_3$ | 1.03 | — |

Sugars

TABLE Ib-continued

Beta-Cyclodextrin
(DS by hydroxypropyl = average 8, range 2-14)

| Structure | Compound | Column Length (m) | Temperature (°C.) | R | α | Elution Order (if known) |
|---|---|---|---|---|---|---|
| 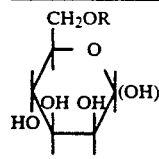 | mannose | 9 | 90 | $-\overset{O}{\underset{\parallel}{C}}-CF_3$ | 1.02 | — |
|  | galactose | 9 | 100 | $-\overset{O}{\underset{\parallel}{C}}-CF_3$ | 1.05 | — |
| 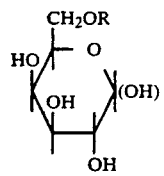 | ribose | 9 | 100 | $-\overset{O}{\underset{\parallel}{C}}-CF_3$ | 1.08 | D, L |
|  | arabinose | 9 | 90 | $-\overset{O}{\underset{\parallel}{C}}-CF_3$ | 1.04 | D, L |
| 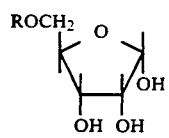 | xylose | 9 | 80 | $-\overset{O}{\underset{\parallel}{C}}-CF_3$ | 1.03 | L, D |
|  | lyxose | 9 | 80 | $-\overset{O}{\underset{\parallel}{C}}-CF_3$ | 1.04 | D, L |
| 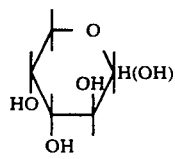 | erythrose | 20 | 80 | $-\overset{O}{\underset{\parallel}{C}}-CF_3$ | 1.03 | L, D |
|  | sorbose | 9 | 90 | $-\overset{O}{\underset{\parallel}{C}}-CF_3$ | 1.12 | L, D |
| 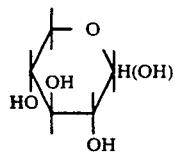 | 1-O-methyl-β-D,L-arabinopyranoside | 20 | 90 | $-\overset{O}{\underset{\parallel}{C}}-CF_3$ | 1.09 | D, L |

TABLE Ib-continued

Beta-Cyclodextrin
(DS by hydroxypropyl = average 8, range 2-14)

| Structure | Compound | Column Length (m) | Temperature (°C.) | R | α | Elution Order (if known) |
|---|---|---|---|---|---|---|
| CHO<br>\|<br>CH₂OR | glyceraldehyde | 30 | 130 | $-\overset{O}{\underset{\|\|}{C}}-CH_3$ | 1.04 | — |
| Bicyclic Compounds | | | | | | |
|  | 5-norbornen-2-ol | 9 | 60 | $-\overset{O}{\underset{\|\|}{C}}-CF_3$ | 1.00<br>1.10 | — |
|  | exo-norbornenol | 9 | 70 | $-\overset{O}{\underset{\|\|}{C}}-CF_3$ | 1.04 | — |
| Miscellaneous | | | | | | |
| $\overset{O}{\underset{\|\|}{C}}-\underset{\underset{OR}{\|}}{C}-\overset{O}{\underset{\|\|}{C}}-O(CH_2)_3CH_3$ | butyl lactate | 9 | 60 | $-\overset{O}{\underset{\|\|}{C}}-CF_3$ | 1.04 | — |

TABLE Ic

Gamma-Cyclodextrin
(DS by hydroxypropyl = average about 9, range between 2-16)

| Structure | Compound | Column Length (m) | Temperature (°C.) | R | α | Elution Order (if known) |
|---|---|---|---|---|---|---|
| 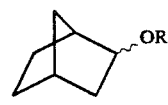 | 2-amino-1-propanol | 9 | 120 | $-\overset{O}{\underset{\|\|}{C}}-CH_3$ | 1.02 | — |
|  | 1-phenyl-ethylamine | 9 | 100 | $-\overset{O}{\underset{\|\|}{C}}-CF_3$ | 1.04 | — |
| 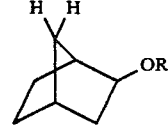 | 2-aminoheptane | 9 | 90 | $-\overset{O}{\underset{\|\|}{C}}-CF_3$ | 1.02 | — |
|  | 1,5-dimethylhexylamine | 9 | 90 | $-\overset{O}{\underset{\|\|}{C}}-CF_3$ | 1.03 | — |
| 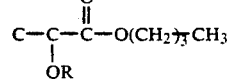 | trans-1,2-dithiane 4,5-diol | 9 | 100 | $-\overset{O}{\underset{\|\|}{C}}-CF_3$ | 1.03 | — |
|  | solketal | 9 | 70 | $-\overset{O}{\underset{\|\|}{C}}-CF_3$ | 1.02 | — |

EXAMPLE 4

This example illustrates separating non-derivatized optical isomers using the medium of permethylated hydroxypropyl ether derivative of cyclodextrin as made in Example 1 above.

The capillary tubes, the gas chromatographs and the determination of α were as set forth in Example 3 above.

Tables IIa, IIb and IIc illustrate the results using alpha-, beta-, and gamma-cyclodextrin, respectively.

TABLE IIa

Alpha-Cyclodextrin
(DS by hydroxypropyl = average about 7, range between 2–12)

| Structure | Compound | Column Length (m) | Temperature (°C.) | α | Elution Order (if known) |
|---|---|---|---|---|---|
| | limonene oxide | 9 | 90 | 1.06 1.20 | — |
| | limonene | 9 | 70 | 1.03 | — |
| | carvon | 9 | 100 | 1.02 | — |
| | 4-phenyl-1,3-dioxane | 9 | 100 | 1.03 | — |
| | mandelic acid methyl ester | 9 | 120 | 1.04 | — |
| | mandelic acid ethyl ester | 9 | 120 | 1.03 | R, S |
| Lactones | | | | | |
| | γ-phenyl-γ-butyro lactone | 9 | 130 | 1.02 | — |
| Bicyclic Compounds | | | | | |
| | exo-2-bromonorbornane | 9 | 90 | 1.01 | — |
| Furan and Pyran Derivatives | | | | | |
| | 2-ethoxy-tetra hydrofuran | 9 | 60 | 1.22 | — |

TABLE IIa-continued

Alpha-Cyclodextrin
(DS by hydroxypropyl = average about 7, range between 2-12)

| Structure | Compound | Column Length (m) | Temperature (°C.) | α | Elution Order (if known) |
|---|---|---|---|---|---|
| | 3,4-dihydro-2-methoxy-2H-pyran | 9 | 60 | 1.06 | — |
| | 3,4-dihydro-2-ethoxy-2H-pyran | 9 | 60 | 1.16 | — |
| | 2,5-dimethoxy-3-tetrahydrofuran carboxaldehyde | 9 | 90 | 1.03<br>1.02<br>1.05<br>1.08 | — |

TABLE IIb

Beta-Cyclodextrin
(DS by hydropropyl = average about 8, ranged between 2-14)

| Structure | Compound | Column Length (m) | Temperature (°C.) | α | Elution Order (if known) |
|---|---|---|---|---|---|
| Alcohols | | | | | |
| | 2-amino-4-methyl 1-butanol | 30 | | 1.11 | — |
| | trans-1,2-cyclohexanediol | 20 | 120 | 1.04 | — |
| | trans-1,2-cycloheptanediol | 20 | 120 | 1.03 | — |
| Nicotine Compounds | | | | | |
| | 3-(1-trifluoromethyl carbonyl-2-pyrrolidinyl)pyridine | 20 | 120-180 | 1.01 | — |
| | 3-(1-difluoromethyl-2-pyrrolidinyl)pyridine | 20 | 140-180 | 1.01 | — |
| Lactones | | | | | |
| | pantoyl lactone | 20 | 120 | 1.04 | — |

TABLE IIb-continued

Beta-Cyclodextrin
(DS by hydropropyl = average about 8, ranged between 2-14)

| Structure | Compound | Column Length (m) | Temperature (°C.) | α | Elution Order (if known) |
|---|---|---|---|---|---|
| | N-acetyl-homocystein thiolactone | 20 | 150 | 1.02 | — |
| | β-butyrolactone | 9 | 70 | 1.03 | — |
| | α-methyl-γ-butyro lactone | 9 | 70 | 1.02 | — |
| | α-acetyl-α-methyl-γ-butyrolactone | 9 | 90 | 1.06 | — |

Furan and Pyran Derivatives

| Structure | Compound | Column Length (m) | Temperature (°C.) | α | Elution Order (if known) |
|---|---|---|---|---|---|
| | 2-ethoxy-tetrahydrofuran | 9 | 50 | 1.11 | — |
| | 3,4-dihydro-2-methoxy-2H-pyran | 9 | 50 | 1.03 | — |
| | 3,4-dihydro-2-ethoxy-2-H-pyran | 9 | 50 | 1.05 | — |
| | tetrahydro-2-(2-propynyloxy)-2H-pyran | 9 | 60 | 1.05 | — |
| | 2,5-dimethoxy-3-tetrahydrofuran carboxaldehyde | 9 | 100 | 1.05 1.10 1.09 1.02 | — |

Epoxides and Glycidyl Analogues

| Structure | Compound | Column Length (m) | Temperature (°C.) | α | Elution Order (if known) |
|---|---|---|---|---|---|
| | 1,2-epoxy-hexane | 20 | 50 | 1.02 | — |
| | 1,2-epoxyoctane | 20 | 50 | 1.01 | — |
| | 1,2-epoxy-7-octene | 20 | 50 | 1.02 | — |

TABLE IIb-continued

Beta-Cyclodextrin
(DS by hydropropyl = average about 8, ranged between 2-14)

| Structure | Compound | Column Length (m) | Temperature (°C.) | α | Elution Order (if known) |
|---|---|---|---|---|---|
| | styrene oxide | 9 | 80 | 1.06 | — |
| | limonene oxide | 20 | 100 | 1.02 1.03 | — |
| | glycidyl methyl ether | 20 | 45 | 1.04 | — |
| | glycidyl isopropyl ether | 20 | 45 | 1.03 | — |
| | allyl glycidyl ether | 20 | 45 | 1.05 | — |
| | t-butyl glycidyl ether | 20 | 45 | 1.06 | — |
| | glycidyl methacrylate | 20 | 70 | 1.01 | — |
| Bicyclic Compounds | | | | | |
| | 2-acetyl-5-norbornene | 9 | 90 | 1.00 1.07 | — |
| | 3-chloro-2-norbornanone | 9 | 90 | 1.00 1.05 | — |
| | exo-2-bromonorbornanone | 9 | 90 | 1.06 | — |
| Miscellaneous | | | | | |
| | limonene | 20 | 100 | 1.03 | — |
| | butyl lactate | 9 | 60 | 1.02 | — |

TABLE IIb-continued

Beta-Cyclodextrin
(DS by hydropropyl = average about 8, ranged between 2-14)

| Structure | Compound | Column Length (m) | Temperature (°C.) | α | Elution Order (if known) |
|---|---|---|---|---|---|
| [CH₂OH, O, O structure] | solketal | 9 | 80 | 1.04 | — |
| [Cl₃C, O, acetate, phenyl structure] | α-(trichloromethyl)benzyl acetate | 20 | 140 | 1.03 | — |

TABLE IIc

Gamma Cyclodextrin
(DS by hydroxypropyl = average about 9, range between 2-16)

| Structure | Compound | Column Length (m) | Temperature (°C.) | α | Elution Order (if known) |
|---|---|---|---|---|---|
| [O, CH₂Br structure] | 2-(bromomethyl)-tetrahydrofuran | 9 | 70 | 1.02 | — |
| [limonene oxide structure] | limonene oxide | 9 | 70 | 1.03<br>1.03 | — |
| [O, OCH₂CH₃ structure] | 3,4-dihydro 2-ethoxy 2H-pyran | 9 | 50 | 1.04 | — |

EXAMPLE 5

This Example illustrates separating enantiomers using the medium of dipentyl trifluoroacetyl ether derivative of cyclodextrin as made in Example 2 above.

Table III illustrates the separation results using the dipentyl trifluoroacetyl ether cyclodextrin (DP-TFA-CD) as the ether derivative of cyclodextrin.

The capacity factor of the first eluted enantiomer, k, is determined as follows:

$$k = \frac{k'}{k''}$$

where k'=retention time of the eluted solute; and k"=retention time of an unretained compound.

The column in the Table for "Stationary Phase" indicates which cyclodextrin was used for the ether derivative. "A" indicates that the ether derivative was dipentyl trifluoroacetyl alpha cyclodextrin; "B" that it was dipentyl trifluoroacetyl beta cyclodextrin; and "G" that it was dipentyl trifluoroacetyl ether gamma cyclodextrin.

The capillary tubes, the gas chromatographs and the determination of α were as set forth in Example 3 above.

TABLE III

Dipentyl Trifluoroacetyl Ether Cyclodextrin (DP-TFA-CD)

| Structure | Compound | (°C.) | k | α | Stationary Phase |
|---|---|---|---|---|---|
| Alcohols, Diols and Polyols | | | | | |
| [OH structure] | 2-butanol | 40<br>40 | 0.69<br>0.82 | 1.22<br>1.16 | B<br>G |

TABLE III-continued

| Dipentyl Trifluoroacetyl Ether Cyclodextrin (DP-TFA-CD) | | | | | |
|---|---|---|---|---|---|
| Structure | Compound | (°C.) | k | α | Stationary Phase |
| OH / alkyne | 3-butyn-2-ol | 70<br>40 | 0.57<br>0.77 | 1.08<br>1.09 | B<br>G |
| OH / pentyl | 2-pentanol | 40<br>40 | 1.31<br>1.61 | 1.26<br>1.27 | B<br>G |
| OH / hexyl | 2-hexanol | 40 | 3.75 | 1.31 | G |
| OH / 4-methylpentyl | 4-methyl-2-pentanol | 40<br>40 | 1.58<br>2.18 | 1.19<br>1.17 | B<br>G |
| OH / heptyl | 2-heptanol | 40<br>40 | 7.85<br>8.39 | 1.25<br>1.26 | B<br>G |
| OH / heptyl | 3-heptanol | 40 | 4.14 | 1.08 | G |
| HO / octyl | 2-octanol | 70<br>40 | 2.80<br>20.7 | 1.06<br>1.15 | B<br>G |
| OH / decyl | 2-decanol | 70<br>40 | 13.4<br>67.1 | 1.18<br>1.22 | B<br>G |
| 1,2-propanediol | 1,2-propanediol | 70<br>70 | 2.06<br>1.67 | 1.08<br>1.18 | A<br>B |
| 1,3-butanediol | 1,3-butanediol | 70<br>70<br>70 | 4.92<br>4.86<br>4.79 | 1.06<br>1.14<br>1.21 | A<br>B<br>G |
| 2,3-butanediol | (2R, 3R)- and (2S, 3S)-butanediol | 70 | 1.43 | 1.58 | G |
| 1,2-pentanediol | 1,2-pentanediol | 70<br>70 | 7.77<br>3.54 | 1.09<br>1.03 | A<br>B |
| 1,4-pentanediol | 1,4-pentanediol | 90<br>70 | 5.23<br>13.6 | 1.06<br>1.05 | B<br>G |
| 1,2-hexanediol | 1,2-hexanediol | 70 | 22.5 | 1.08 | A |
| 1,2-octanediol | 1,2-octanediol | 90 | 10.6 | 1.05 | B |
| trans-1,2-cyclohexanediol | trans-1,2-cyclohexanediol | 70 | 12.0 | 1.58 | G |
| trans-1,2-cycloheptanediol | trans-1,2-cycloheptanediol | 70 | 19.6 | 1.15 | G |

TABLE III-continued

Dipentyl Trifluoroacetyl Ether Cyclodextrin
(DP-TFA-CD)

| Structure | Compound | (°C.) | k | α | Stationary Phase |
|---|---|---|---|---|---|
| (cyclooctane with two OH, trans) | trans-1,2-cycloocanediol | 70 | 36.0 | 1.12 | G |
| HOCH₂-CH(OH)-CH₂-CH₂OH (1,2,4-butanetriol structure) | 1,2,4-butanetriol | 110 | 8.10 | 1.02 | B |
| HOCH₂-CH(OH)-(CH₂)₃-OH | 1,2,6-hexanetriol | 110 | 23.3 | 1.07 | B |
| (HO)H₂C—CH(OH)—CH(OH)—CH(OH)—CHO | arabitol | 100 | 20.6 | 1.06 | B |
| Amino Alcohols | | | | | |
| HOCH₂-CH(NH₂)-CH₃ | 2-amino-1-propanol | 100 | 5.88 | 1.07 | A |
| | | 110 | 3.81 | 1.16 | B |
| | | 100 | 6.53 | 1.99 | G |
| H₂N-CH₂-CH(OH)-CH₃ | 1-amino-2-propanol | 100 | 6.25 | 1.14 | A |
| | | 110 | 4.76 | 1.03 | B |
| | | 100 | 5.71 | 1.20 | G |
| HOCH₂-CH(NH₂)-CH₂CH₃ | 2-amino-1-butanol | 110 | 7.31 | 1.08 | A |
| | | 110 | 3.42 | 1.06 | B |
| | | 100 | 7.04 | 1.17 | G |
| HOCH₂-CH(NH₂)-CH₂CH₂CH₃ | 2-amino-1-pentanol | 110 | 4.33 | 1.14 | B |
| | | 100 | 8.93 | 1.14 | G |
| HOCH₂-CH(NH₂)-CH(CH₃)₂ | 2-amino-3-methyl-1-butanol | 110 | 2.95 | 1.07 | B |
| | | 100 | 6.43 | 1.19 | G |
| HOCH₂-CH(NH₂)-(CH₂)₃CH₃ | 2-amino-1-hexanol | 110 | 15.0 | 1.04 | A |
| | | 110 | 7.57 | 1.11 | B |
| | | 100 | 10.4 | 1.1 | G |
| HOCH₂-CH(NH₂)-CH₂-CH(CH₃)₂ | leucinol | 120 | 3.81 | 1.06 | A |
| | | 110 | 4.33 | 1.14 | B |
| HOCH₂-CH(OH)-CH₂-NH₂ | 3-amino-1,2-propanediol | 140 | 6.14 | 1.12 | B |
| Amines | | | | | |
| CH₃-CH(NH₂)-CH₂CH₃ | 2-aminobutane | 80 | 4.29 | 1.04 | G |
| CH₃-CH(NH₂)-CH₂CH₂CH₃ | 2-aminopentane | 80 | 3.75 | 1.03 | A |
| CH₃-CH(NH₂)-CH₂-CH(CH₃)₂ | 1,3-dimethylbutylamine | 80 | 4.88 | 1.06 | A |
| CH₃-CH(NH₂)-(CH₂)₄CH₃ | 2-aminoheptane | 90 | 10.3 | 1.07 | A |
| | | 80 | 19.6 | 1.02 | G |

TABLE III-continued

Dipentyl Trifluoroacetyl Ether Cyclodextrin (DP-TFA-CD)

| Structure | Compound | (°C.) | k | α | Stationary Phase |
|---|---|---|---|---|---|
| | 3-aminoheptane | 90 | 7.19 | 1.06 | A |
| | | 80 | 13.4 | 1.03 | G |
| | 1,5-dimethylhexylamine | 90 | 10.1 | 1.01 | A |
| | | 80 | 28.4 | 1.01 | G |
| | 1-cyclohexylethylamine | 100 | 11.2 | 1.08 | B |
| | 1-phenylethylamine | 100 | 12.9 | 1.05 | B |
| | 1-aminoindan | 140 | 4.06 | 1.06 | A |
| | 1,2,3,4-tetrahydro-1-naphthylamine | 140 | 6.12 | 1.04 | A |
| | | 140 | 8.21 | 1.03 | G |
| Carboxylic Acid Esters | | | | | |
| | lactic acid methyl ester | 50 | 6.79 | 1.47 | G |
| | lactic acid butyl ester | 60 | 15.0 | 1.05 | G |
| | mandelic acid methyl ester | 110 | 4.00 | 1.04 | B |
| | mandelic acid ethyl ester | 110 | 3.57 | 1.03 | B |
| | | 120 | 4.11 | 1.09 | G |
| | D,L-tartaric acid dimethyl ester | 90 | 2.79 | 1.04 | B |
| | D,L-tartaric acid diisopropyl ester | 90 | 8.57 | 1.07 | B |

TABLE III-continued

| Dipentyl Trifluoroacetyl Ether Cyclodextrin (DP-TFA-CD) | | | | | |
|---|---|---|---|---|---|
| Structure | Compound | (°C.) | k | α | Stationary Phase |
| (structure) | 2-chloropropionic acid methyl ester | 60<br>60 | 6.25<br>5.00 | 2.69<br>2.14 | B<br>G |
| (structure) | 2-bromobutyric acid sec-butyl ester+ | 80 | 10.0<br>10.6 | 1.22<br>1.07 | G |
| (structure) | 2-bromopropionic acid methyl ester | 80<br>80 | 9.38<br>2.44 | 1.12<br>1.47 | B<br>G |
| (structure) | 2-bromopropionic acid ethyl ester | 80<br>80 | 3.85<br>3.50 | 1.14<br>1.16 | B<br>G |
| (structure) | 2-bromopropionic acid btuyl ester | 80 | 8.00 | 1.05 | G |
| (structure) | 2-bromopropionic acid pentyl ester | 80 | 15.6 | 1.04 | G |
| (structure) | 2-bromopropionic acid hexyl ester | 80 | 30.9 | 1.04 | G |
| (structure) | 2-bromopropionic acid sec-butyl ester+ | 60<br><br>80 | 12.0<br>12.5<br>4.89<br>5.39 | 1.25<br>1.05<br>1.29<br>1.02 | B<br><br>G |
| (structure) | 2-bromopropionic acid sec-pentyl ester+ | 60<br><br>80 | 21.5<br>22.9<br>8.00<br>8.37 | 1.28<br>1.12<br>1.24<br>1.05 | B<br><br>G |
| (structure) | 2-bromopropionic acid sec-hexyl ester+ | 60<br><br>80 | 45.6<br>49.5<br>14.7<br>15.1 | 1.26<br>1.10<br>1.25<br>1.07 | B<br><br>G |
| (structure) | 2-bromopropionic acid sec-heptyl ester+ | 90 | 15.1<br>15.4 | 1.16<br>1.04 | G |
| (structure) | 2-bromopropionic acid sec-octyl ester+ | 90 | 29.3<br>29.6 | 1.16<br>1.03 | G |

Halohydrocarbons

| | 2-bromo-1-chloropropane | 40<br>40<br>30 | 4.31<br>4.00<br>7.64 | 1.06<br>1.12<br>1.05 | A<br>B<br>G |

TABLE III-continued

Dipentyl Trifluoroacetyl Ether Cyclodextrin
(DP-TFA-CD)

| Structure | Compound | (°C.) | k | α | Stationary Phase |
|---|---|---|---|---|---|
| [Cl on C2 of butane] | 2-chlorobutane | 30 | 0.73 | 1.10 | A |
| | | 30 | 0.91 | 1.12 | G |
| [Cl on C3 of 1-butene] | 3-chloro-1-butene | 30 | 0.72 | 1.06 | A |
| | | 30 | 0.82 | 1.13 | G |
| [Br on C2 of butane] | 2-bromobutane | 30 | 1.65 | 1.38 | A |
| | | 35 | 1.74 | 1.04 | B |
| | | 30 | 2.44 | 1.09 | G |
| [I on C2 of butane] | 2-iodobutane | 40 | 2.92 | 1.04 | A |
| | | 60 | 1.31 | 1.24 | B |
| | | 30 | 6.36 | 1.06 | G |
| [1,2-dichlorobutane] | 1,2-dichlorobutane | 60 | 2.45 | 1.09 | B |
| | | 60 | 0.89 | 1.04 | G |
| [2,3-dichlorobutane] | (2R, 3R) and (2S, 3S) 2,3-dichlorobutane | 60 | 2.15 | 1.59 | B |
| | | 60 | 2.05 | 1.60 | G |
| [1,2-dibromobutane] | 1,2-dibromobutane | 90 | 4.13 | 1.03 | A |
| | | 70 | 4.54 | 1.03 | B |
| | | 60 | 8.57 | 1.13 | G |
| [1,3-dibromobutane] | 1,3-dibromobutane | 90 | 6.38 | 1.02 | A |
| | | 70 | 7.38 | 1.05 | B |
| | | 60 | 13.6 | 1.79 | G |
| [2-bromopentane] | 2-bromopentane | 35 | 3.44 | 1.03 | B |
| | | 30 | 8.27 | 1.32 | G |
| [2-bromoheptane] | 2-bromoheptane | 70 | 4.15 | 1.07 | B |
| | | 50 | 8.57 | 1.18 | G |
| [2-bromo-1-phenylpropane] | 2-bromo-1-phenylpropane | 100 | 6.39 | 1.06 | G |
| Epoxides, Glycidyl Analogoues and Haloepihydrine | | | | | |
| [epoxide-(CH$_2$)$_3$CH$_3$] | 1,2-epoxyhexane | 50 | 3.31 | 1.02 | A |
| | | 40 | 5.36 | 1.10 | G |
| [epoxide-(CH$_2$)$_5$CH$_3$] | 1,2-epoxyoctane | 50 | 22.3 | 1.04 | A |
| [epoxide-(CH$_2$)$_7$CH$_3$] | 1,2-epoxydecane | 90 | 9.88 | 1.02 | A |
| [epoxide-(CH$_2$)$_9$CH$_3$] | 1,2-epoxydodecane | 90 | 108 | 1.02 | A |
| [epoxide-(CH$_2$)$_{11}$CH$_3$] | 1,2-epoxytetradecane | 100 | 125 | 1.02 | A |

TABLE III-continued

| | Dipentyl Trifluoroacetyl Ether Cyclodextrin (DP-TFA-CD) | | | | |
|---|---|---|---|---|---|
| Structure | Compound | (°C.) | k | α | Stationary Phase |
| | styrene oxide | 80<br>80 | 5.57<br>10.7 | 1.01<br>1.57 | B<br>G |
| | limonene oxide+ | 80 | 8.57<br>8.57 | 1.06<br>1.10 | G |
| | trans-stilbene oxide | 140 | 20.0 | 1.02 | G |
| | ±-1,3-butadiene diepoxide | 80 | 3.93 | 1.11 | G |
| | glycidol | 60 | 4.29 | 1.06 | G |
| | glycidyl methyl ether | 40<br>45 | 3.33<br>5.89 | 1.04<br>1.16 | B<br>G |
| | glycidyl isopropyl ether | 40<br>45 | 6.00<br>10.5 | 1.04<br>1.04 | B<br>G |
| | allyl glycidyl ether | 50<br>45 | 3.23<br>21.6 | 1.02<br>1.42 | A<br>G |
| | n-butyl glycidyl ether | 50<br>45 | 11.8<br>23.2 | 1.02<br>1.04 | B<br>G |
| | t-butyl glycidyl ether | 45 | 14.5 | 1.06 | G |
| | glycidyl acrylate | 80 | 10.1 | 1.14 | G |
| | glycidyl methacrylate | 80 | 10.4 | 1.04 | G |
| | (2S, 3S) and (2R, 3R)-2-methyl-3-phenyl-glycidol | 100 | 13.6 | 1.06 | G |
| | epifluorohydrin | 30 | 2.50 | 1.02 | G |
| | epichlorohydrin | 60 | 4.82 | 1.20 | G |

TABLE III-continued

Dipentyl Trifluoroacetyl Ether Cyclodextrin
(DP-TFA-CD)

| Structure | Compound | (°C.) | k | α | Stationary Phase |
|---|---|---|---|---|---|
| | epibromohydrin | 60 | 4.82 | 1.20 | G |
| Lactones | | | | | |
| | β-butyrolactone | 110 | 2.73 | 1.14 | A |
| | | 70 | 13.7 | 1.62 | B |
| | | 80 | 7.14 | 1.20 | G |
| | 3-hydroxy-4,4,4-trichlorobutyric-β-lactone | 120 | 3.50 | 1.11 | B |
| | | 100 | 15.6 | 1.19 | G |
| | α-methyl-γ-butyrolactone | 110 | 3.03 | 1.29 | A |
| | | 110 | 11.5 | 1.07 | B |
| | α-acetyl-α-methyl-γ-butyrolactone | 120 | 6.28 | 1.59 | B |
| | pantoyl lactone | 120 | 4.25 | 1.04 | A |
| | | 120 | 1.57 | 1.05 | B |
| | β,β'-dimethyl-γ-(hydroxymethyl)-γ-butyrolactone | 120 | 12.3 | 1.10 | B |
| | γ-nonanoiclactone | 160 | 4.07 | 1.06 | B |
| | α-bromo-γ-valerolactone+ | 150 | 4.64 | 1.09 | G |
| | | | 5.36 | 1.09 | |
| | γ-decanolactone | 140 | 9.24 | 1.05 | G |
| | δ-decanolactone | 140 | 11.8 | 1.02 | G |
| Furan and Pyran Derivatives | | | | | |
| | 2-ethoxy-tetrahydrofuran | 40 | 3.63 | 1.03 | A |
| | | 40 | 3.08 | 1.05 | B |
| | | 45 | 3.04 | 1.20 | G |
| | 3,4-dihydro-2-methoxy-2H-pyran | 40 | 3.38 | 1.07 | A |
| | | 40 | 4.33 | 1.22 | B |
| | | 45 | 4.29 | 1.13 | G |

TABLE III-continued

Dipentyl Trifluoroacetyl Ether Cyclodextrin (DP-TFA-CD)

| Structure | Compound | (°C.) | k | α | Stationary Phase |
|---|---|---|---|---|---|
| | 3,4-dihydro-2-ethoxy-2H-pyran | 40 | 5.85 | 1.04 | A |
| | | 40 | 5.92 | 1.06 | B |
| | | 45 | 6.07 | 1.09 | G |
| | tetrahydro-2-(2-propynyloxy)-2H-pyran | 80 | 3.71 | 1.01 | B |
| | | 70 | 8.14 | 1.08 | G |
| | 2-(chloromethyl)tetrahydropyran | 80 | 3.24 | 1.28 | B |
| | | 70 | 8.04 | 1.03 | G |
| | 2-(bromomethyl)tetrahydropyran | 80 | 6.07 | 1.25 | B |
| | 3-hydroxy-tetrahydropyran | 50 | 7.14 | 1.18 | G |
| | trans-2,5-dimethyltetrahydrofuran | 45 | 8.57 | 1.06 | G |
| | trans-2,5-dimethoxytetrahydrofuran | 60 | 1.46 | 1.92 | G |

Nicotine Compounds

| Structure | Compound | (°C.) | k | α | Stationary Phase |
|---|---|---|---|---|---|
| | nicotine | 160 | 2.14 | 1.13 | B |
| | 1-methyl-2-phenyl-pyrrolidine | 160 | 1.43 | 1.20 | B |
| | 2-benzylpyrrolidine | 140 | 10.2 | 1.06 | B |

Bicyclic Compounds

| Structure | Compound | (°C.) | k | α | Stationary Phase |
|---|---|---|---|---|---|
| | endo- and exo-2-acetyl-5-norbornene+ | 110 | 1.73 | 1.03 | B |
| | | | 2.45 | 1.00 | |
| | | 100 | 4.39 | 1.11 | G |
| | | | 6.32 | 1.09 | |

TABLE III-continued

Dipentyl Trifluoroacetyl Ether Cyclodextrin (DP-TFA-CD)

| Structure | Compound | (°C.) | k | α | Stationary Phase |
|---|---|---|---|---|---|
| | endo- and exo-2-aminonorbornane+ | 110 | 4.71<br>6.21 | 1.18<br>1.10 | B |
| | endo- and exo-2-benzoyl-5-norbornene+ | 120 | 34.6<br>41.8 | 1.00<br>1.04 | G |
| | exo-2-bromonorbornane | 70 | 11.3 | 1.02 | G |
| | exo-2-chloronorbornane | 70 | 5.79 | 1.01 | G |
| | endo- and exo-3-chloro-2-norbornanone+ | 120 | 6.57<br>10.2 | 1.06<br>1.04 | G |
| | DL-isoborneol | 70 | 8.68 | 1.05 | G |

Ketones

| Structure | Compound | (°C.) | k | α | Stationary Phase |
|---|---|---|---|---|---|
| | 2-methyl-cyclohexanone | 80 | 5.29 | 1.08 | G |
| | carvone | 90<br>110<br>100 | 13.6<br>7.05<br>11.4 | 1.04<br>1.09<br>1.01 | A<br>B<br>G |

Miscellaneous

| Structure | Compound | (°C.) | k | α | Stationary Phase |
|---|---|---|---|---|---|
| | 3-chloro-2-butanone | 50<br>60 | 3.46<br>2.43 | 1.62<br>1.59 | B<br>G |
| | solketal | 90<br>60 | 1.57<br>7.86 | 1.04<br>1.07 | B<br>G |
| | 3-chloro-1,2-propanediol | 90 | 3.52 | 1.09 | B |
| | 2-chloropropionitrile | 80<br>70 | 1.93<br>1.65 | 1.07<br>1.06 | B<br>G |

TABLE III-continued

Dipentyl Trifluoroacetyl Ether Cyclodextrin
(DP-TFA-CD)

| Structure | Compound | (°C.) | k | α | Stationary Phase |
|---|---|---|---|---|---|
| | 2-bromopropionitrile | 80<br>70 | 4.07<br>4.13 | 1.14<br>1.06 | B<br>G |
| | 1-chloro-2-propanol | 70 | 5.21 | 1.02 | G |
| | 4-phenyl-1,3-dioxane | 120 | 7.36 | 1.04 | G |
| | 2-chlorocyclopentanone | 90<br>110 | 12.6<br>2.47 | 2.51<br>1.33 | B<br>G |
| | 2-amino-1-methoxy-propane | 90<br>100 | 1.90<br>1.71 | 1.25<br>1.08 | B<br>G |
| | 2-chlorocyclohexanone | 90<br>110 | 21.2<br>4.26 | 1.06<br>1.10 | B<br>G |
| | 2-methyl-piperidin | 100 | 5.54 | 1.13 | G |
| | 3-methyl-piperidin | 100 | 5.00 | 1.14 | G |
| | mandelonitrile | 100 | 5.21 | 1.10 | G |
| | ethyl-3-phenyl-glycidate+ | 120 | 16.6<br>23.8 | 1.05<br>1.04 | G |

+compound containing more than one chiral center.

EXAMPLE 6

This Example illustrates retention and selectivity results of homologous racemic amines, diols, and α-halocarboxylic acid esters using the medium of dipentyl trifluoroacetyl ether cyclodextrin as made in Example 2 above. These results are set forth in the following Table IV.

The capillary tubes, the gas chromatographs and the determination of α were as set forth in Example 3 above.

The capacity factor and the indication of the base cyclodextrin used were as set forth in Example 4 above.

TABLE IV

| Structure | Compound | (°C.) | k | α | Stationary Phase |
|---|---|---|---|---|---|
| NH₂ on 2-carbon of butane | 2-aminobutane | 90 | 1.55 | 1.14 | B |
| NH₂ on 2-carbon of 3,3-dimethylbutane | 2-amino-3,3-dimethylbutane | 90 | 2.10 | 1.22 | B |
| NH₂ on 2-carbon of pentane | 2-aminopentane | 90 | 2.40 | 1.22 | B |
| NH₂ on 1-carbon of 1,3-dimethylbutyl | 1,3-dimethylbutylamine | 90 | 2.80 | 1.22 | B |
| NH₂ on 2-carbon of heptane | 2-aminoheptane | 90 | 8.15 | 1.22 | B |
| NH₂ on 1-carbon of 1,5-dimethylhexyl | 1,5-dimethylhexylamine | 90 | 12.5 | 1.22 | B |
| HOCH₂-CH(OH)-CH₃ | 1,2-propanediol | 70 | 1.61 | 1.49 | G |
| HOCH₂-CH(OH)-C₃H₇ | 1,2-pentanediol | 70 | 3.50 | 1.23 | G |
| HOCH₂-CH(OH)-C₄H₉ | 1,2-hexanediol | 70 | 6.64 | 1.23 | G |
| HOCH₂-CH(OH)-C₆H₁₃ | 1,2-octanediol | 70 | 29.3 | 1.23 | G |
| 2-bromobutyric acid methyl ester structure | 2-bromobutyric acid methyl ester | 80<br>80 | 5.07<br>6.71 | 1.56<br>1.57 | B<br>G |
| 2-bromobutyric acid ethyl ester structure | 2-bromobutyric acid ethyl ester | 80<br>80 | 5.25<br>9.93 | 1.29<br>1.16 | B<br>G |
| 2-bromobutyric acid isopropyl ester structure | 2-bromobutyric isopropyl ester | 80 | 6.57 | 1.08 | G |
| 2-bromobutyric acid butyl ester structure | 2-bromobutyric acid butyl ester | 80<br>80 | 15.5<br>20.5 | 1.16<br>1.09 | B<br>G |
| 2-bromobutyric acid pentyl ester structure O(CH₂)₄CH₃ | 2-bromobutyric acid pentyl ester | 80<br>80 | 32.3<br>39.5 | 1.16<br>1.08 | B<br>G |
| 2-bromobutyric acid hexyl ester structure O(CH₂)₅CH₃ | 2-bromobutyric acid hexyl ester | 80<br>80 | 66.4<br>80.0 | 1.16<br>1.09 | B<br>G |

EXAMPLE 7

A test was made to determine if the stereochemistry of the ether side chain has any effect on separation.

Three different media were prepared, permethyl-(S)-hydroxypropyl-beta-cyclodextrin; permethyl-(R)-hydroxypropyl-beta cyclodextrin; and permethyl-(racemic)-hydroxypropyl-beta-cyclodextrin.

Three identical columns were coated with these materials and a series of tests were run. Each of the three columns produced essentially identical separations.

It will be understood that it is intended to cover all changes and modifications of the preferred embodiments herein chosen for the purpose of illustration which do not constitute a departure from the spirit and scope of the invention.

What is claimed is:

1. A method for separation of compounds by means of gas chromatography comprising:
   a) passing a mixture of compounds having different structure through a column having a dialkyl trifluoro ester ether derivative of cyclodextrin; and
   b) eluting separated individual compounds from said column.

2. The method of claim 1 wherein the dialkyl trifluoro ester ether of cyclodextrin has about 20% to about 80% of the hydrogens of the hydroxyl groups of the cyclodextrin substituted with alkyl side chains and at least about 90% of the hydrogens of the remaining hydroxyl groups of the alkylated ether of cyclodextrin substituted with a fluorinated ester group.

3. The method of claim 2 wherein the dialkyl trifluoroester ether of cyclodextrin is selected from the group consisting of dipentyl trifluorinated acetic ether of cyclodextrin, dipentyl trifluorinated butanoic ether of cyclodextrin, and dipentyl trifluorinated propanoic ether of cyclodextrin.

4. The method of claim 2 wherein the cyclodextrin is selected from the group consisting of alpha-cyclodextrin, beta-cyclodextrin, and gamma-cyclodextrin.

5. The method of claim 1 wherein the ether derivative of cyclodextrin is administered into the column by means of a carrier.

6. The method of claim 5 wherein the carrier is polyethylene glycol or polysiloxane.

7. The method of claim 1 wherein the column is a fused silica capillary and the dialkyl trifluoro ester ether derivative of cyclodextrin is applied as a stationary phase coating on the capillary.

* * * * *